United States Patent
Akari et al.

(10) Patent No.: US 9,366,900 B2
(45) Date of Patent: Jun. 14, 2016

(54) ADHESIVE FOR POLARIZING PLATE, POLARIZING PLATE, METHOD FOR PRODUCING SAME, OPTICAL FILM, AND IMAGE DISPLAY DEVICE

(75) Inventors: Reiko Akari, Ibaraki (JP); Tetsurou Ikeda, Ibaraki (JP); Masashi Shinagawa, Ibaraki (JP); Yoshifumi Asahara, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 429 days.

(21) Appl. No.: 13/581,916

(22) PCT Filed: Mar. 3, 2011

(86) PCT No.: PCT/JP2011/054925
§ 371 (c)(1),
(2), (4) Date: Aug. 30, 2012

(87) PCT Pub. No.: WO2011/108647
PCT Pub. Date: Sep. 9, 2011

(65) Prior Publication Data
US 2012/0320459 A1 Dec. 20, 2012

(30) Foreign Application Priority Data

Mar. 5, 2010 (JP) ................................. 2010-048630
Sep. 30, 2010 (JP) ................................. 2010-222791
Sep. 30, 2010 (JP) ................................. 2010-222797

(51) Int. Cl.
*G02F 1/1335* (2006.01)
*G02B 5/30* (2006.01)

(52) U.S. Cl.
CPC ..... *G02F 1/133528* (2013.01); *B32B 2457/202* (2013.01); *C09J 2203/318* (2013.01); *G02B 5/3025* (2013.01); *G02F 2201/54* (2013.01); *G02F 2202/28* (2013.01); *Y10T 428/1041* (2015.01); *Y10T 428/1059* (2015.01)

(58) Field of Classification Search
CPC ......... C08K 3/34; C08K 5/175; C09J 129/04; C09J 2203/318; G02B 5/3025; G02F 1/133528; G02F 2201/54; G02F 2202/28; Y10T 428/1059; Y10T 428/1041; B32B 2457/202
USPC ............... 428/1.31, 1.5–1.55, 355 R, 355 CP, 428/355 EN; 349/96, 122
See application file for complete search history.

(56) References Cited

U.S. PATENT DOCUMENTS

| | | | |
|---|---|---|---|
| 2,850,397 A * | 9/1958 | Dereich | C04B 28/26 106/610 |
| 5,200,458 A * | 4/1993 | Iwasaki et al. | 524/456 |
| 5,676,885 A | 10/1997 | Starzewski | |
| 5,770,316 A | 6/1998 | Starzewski | |
| 5,897,703 A * | 4/1999 | Hatakeyama et al. | 106/696 |
| 2005/0069589 A1* | 3/2005 | Lowinger et al. | 424/488 |
| 2006/0207649 A1* | 9/2006 | Nabeta | 136/258 |
| 2007/0178251 A1 | 8/2007 | Kawabe | |
| 2008/0123189 A1 | 5/2008 | Ikeda et al. | |
| 2009/0040611 A1 | 2/2009 | Kitamura et al. | |
| 2010/0283946 A1 | 11/2010 | Ueda et al. | |

FOREIGN PATENT DOCUMENTS

| | | |
|---|---|---|
| CN | 101363932 A | 2/2009 |
| JP | 55-033478 B2 | 8/1980 |
| JP | 02-311582 A | 12/1990 |
| JP | 4-180982 A | 6/1992 |
| JP | 07-198645 A | 8/1995 |
| JP | 07-198945 A | 8/1995 |
| JP | 08-068908 A | 3/1996 |
| JP | 09-178944 A | 7/1997 |
| JP | 10-166519 A | 6/1998 |
| JP | 11-10797 A | 1/1999 |
| JP | 2006-282952 A | 10/2006 |
| JP | 2006282952 A * | 10/2006 |
| JP | 2008-015483 A | 1/2008 |
| JP | 4039682 B2 | 1/2008 |
| JP | 4790079 B1 | 10/2011 |
| WO | 2005/085383 A1 | 9/2005 |
| WO | 2009/090932 A1 | 7/2009 |

OTHER PUBLICATIONS

English Translation by FLS, Inc. of JP 55-033478, Feb. 27, 1974.*
International Search Report of PCT/JP2011/054925, mailing date of May 10, 2011.
Taiwanese Office Action dated Jun. 4, 2013, issued in corresponding Taiwanese Patent Application No. 100107415, with English translaton (10 pages).
Chinese Office Action dated Jan. 6, 2014, issued in corresponding Chinese Patent Application No. 201180007014.0 with English translation (21 pages).
Japanese Office Action dated Aug. 23, 2012, issued in corresponding Japanese Patent Application No. 2010-222791, (3 pages). With English Translation.

(Continued)

*Primary Examiner* — Sophie Hon
(74) *Attorney, Agent, or Firm* — Westerman, Hattori, Daniels & Adrian, LLP

(57) ABSTRACT

An object of the invention is to provide an adhesive for a polarizing plate that has high adhering strength, makes it possible to prevent a reduction in the light transmittance of a polarizing plate and to suppress the occurrence of knicks, and is less likely to cause a reduction in the light transmittance of a polarizing plate even in a humidified environment while having the above characteristics. The invention is directed to an adhesive for a polarizing plate for use in fixing a transparent protective film on at least one side of a polarizer, the adhesive including a resin solution containing a polyvinyl alcohol-based resin and a water-soluble silicate.

11 Claims, No Drawings

(56) References Cited

OTHER PUBLICATIONS

Notification of Transmittal of Translation of the International Preliminary Report on Patentability dated Oct. 2, 2012, issued in International Patent Application No. PCT/JP2011/054925.

Korean Office Action dated Aug. 30, 2013, issued in corresponding Korean Patent Application No. 2012-7021365 with English translation (6 pages).

Office Action dated Nov. 2, 2015, issued in counterpart Chinese Patent Application No. 201410440461.0, with English translation. (15 pages).

* cited by examiner

ADHESIVE FOR POLARIZING PLATE, POLARIZING PLATE, METHOD FOR PRODUCING SAME, OPTICAL FILM, AND IMAGE DISPLAY DEVICE

BACKGROUND OF THE INVENTION

1. Field of the Invention

The present invention relates to an adhesive for polarizing plate. The present invention further relates to a polarizing plate and manufacturing method thereof using the adhesive for polarizing plate. The polarizing plate alone or an optical film obtained by laminating the polarizing plate can constitute an image display such as a liquid crystal display, an organic EL display or PDP.

2. Description of the Related Art

In the liquid crystal displays, for example, it is indispensable to dispose polarizers on both sides of a glass substrate providing a surface of a liquid crystal panel according to an image formation scheme adopted in the display. A polarizer is generally obtained in a procedure in which a polyvinyl alcohol-based film is dyed with a dichroic material such as iodine, thereafter, the film is crosslinked with a crosslinking agent and then, mono-axially stretched to thereby form a film. Since the polarizer is manufactured by stretching, it is easy to shrink. Since a polyvinyl alcohol-based film comprises a hydrophilic polymer, the film is very easily deformed especially in a humidified condition. Since the film itself is weak in mechanical strength, there has been a problem that the film is torn. Hence, adopted is a reinforced polarizing plate manufactured in a procedure in which a transparent protective film or transparent protective films each made from triacetyl cellulose or the like are adhered to on one side or both sides of a polarizer. The polarizing plate is manufactured by adhere the transparent protective film onto a polarizer using an adhesive.

In recent years, the range of uses of liquid crystal displays has been increased and extended to cover from portable terminals to large screen home TVs, and their standards have been defined for each application. In particular, portable terminal applications, which must be portable for users, strongly demand durability. For example, polarizing plates are required to have water resistance to such an extent that their properties and form will not change even under humidified conditions such as conditions causing dew condensation.

As mentioned above, a polarizer may be reinforced in strength with a transparent protective film to form a polarizing plate before use. As an adhesive for polarizing plate used in adhesion of the polarizer and the transparent protective film to each other, an aqueous type adhesive is conventionally preferable and, for example, a polyvinyl alcohol-based adhesive obtained by mixing a crosslinking agent into a polyvinyl alcohol aqueous solution has been employed. A polyvinyl alcohol-based adhesive may cause peeling at the interface between a polarizer and a transparent protective film in a humidified environment. This is considered because a polyvinyl alcohol-based resin, which is a main component of the adhesive, is a water-soluble polymer and a possibility of dissolution of an adhesive occurs in a situation of dewing. In order to cope with the problem, a proposal has been offered of an adhesive for polarizing plate containing a polyvinyl alcohol-based resin having an acetoacetyl group, and a crosslinking agent (Patent Document 1). An aqueous adhesive for polarizing elements is also proposed which contains a polyvinyl alcohol resin, a resin having a maleic anhydride skeleton in the structure, and a crosslinking agent (Patent Document 2).

The production of polarizing plates has a problem in that knicks (knick defects) occur in the process of bonding a polarizer and a transparent protective film together with the polyvinyl alcohol-based adhesive interposed therebetween. Knicks are local concave-convex defects, which are formed at the interface between a polarizer and a transparent protective film. Against such knicks, a method of laminating a polarizer and a transparent protective film is proposed, in which the polarizer used is a product obtained by subjecting, to a calender roll treatment under specific conditions, the surface of a polyvinyl alcohol-based film with an adjusted water content (Patent Document 3). In particular, knicks are more likely to occur when a polyvinyl alcohol-based resin containing an acetoacetyl group is used as a polyvinyl alcohol-based adhesive.

To suppress the occurrence of knicks, an adhesive for a polarizing plate is proposed which includes a resin solution containing a polyvinyl alcohol-based resin, a crosslinking agent, and a metal compound colloid with an average particle size of 1 to 100 nm (Patent Document 4). Since the metal compound colloid usually has a refractive index higher than that of the polyvinyl alcohol-based resin, the adhesive layer formed using such an adhesive for a polarizing plate tends to have a high refractive index. Therefore, reflection of light is more likely to occur at each of the interface between a polarizer and the adhesive layer and the interface between a transparent protective film and the adhesive layer, which may cause a reduction in the light transmittance of a polarizing plate. In recent years, as the contrast of liquid crystal panels has been increased, there has been a stronger demand for the improvement of the optical properties of polarizing plates.

Patent Document 5 discloses a laminated flexible polarizer including a polarizing core layer and an outer layer, which are bonded together with a silicic acid salt layer, so that the laminated flexible polarizer has thermal stability and flexibility. Patent Document 6 discloses a laminated polarizer including a polarizing core layer and a cladding layer, which are bonded together with a silicate layer, so that the laminated polarizer has thermal stability and flexibility.

Unfortunately, the silicic acid salt layer or the silicate layer made from an aqueous silicate solution has low adhering strength and therefore may often cause peeling at interfaces with a polarizer and a transparent protective film.

On the other hand, a variety of compounds are known as crosslinking agents for polyvinyl alcohol-based resins. Among them, amino-formaldehyde resin, which has high reactivity with an acetoacetyl group, is advantageously used in view of water resistance.

Unfortunately, amino-formaldehyde resin, which contains formaldehyde, has raised concerns about the effect of a strong irritating odor on working environments or the safety of the residue in products. In addition, amino-formaldehyde resin, which has high reactivity with an acetoacetyl group and therefore allows crosslinking reaction to proceed easily at room temperature, also has a problem such as a reduction in workability due to an increase in viscosity during storage, and gelation at the final stage, which makes the use of it impossible, or a shortened pot life.

To solve the above problems, the use of a metal salt as a crosslinking agent has been studied. Unfortunately, excessive addition of the metal salt may increase the refractive index of the adhesive layer, so that reflection of light may be more likely to occur at each of the interface between a polarizer and the adhesive layer and the interface between a transparent protective film and the adhesive layer, which may cause a reduction in the light transmittance of a polarizing plate. In recent years, as the contrast of liquid crystal panels has been increased, there has been a stronger demand for the improvement of the optical properties of polarizing plates.

PRIOR ART DOCUMENTS

Patent Documents

Patent Document 1: JP-A-07-198945
Patent Document 2: WO 2005/085383 A
Patent Document 3: JP-A-10-166519
Patent Document 4: JP-B-4039682
Patent Document 5: JP-A-08-68908
Patent Document 6: JP-A-09-178944

SUMMARY OF THE INVENTION

Problems to be Solved by the Invention

An object of a first aspect of the invention is to provide an adhesive for a polarizing plate that has high adhering strength, makes it possible to prevent a reduction in the light transmittance of a polarizing plate and to suppress the occurrence of knicks, and is less likely to cause a reduction in the light transmittance of a polarizing plate even in a humidified environment while having the above characteristics.

An object of a second aspect of the invention is to provide an adhesive for a polarizing plate that has high adhering strength and high liquid stability, makes it possible to prevent a reduction in the light transmittance of a polarizing plate, and is less likely to cause a reduction in the light transmittance of a polarizing plate even in a humidified environment while having the above characteristics.

It is another object of the present invention to provide a polarizing plate using the adhesive for polarizing plate and a manufacturing method thereof. It is yet another object of the present invention to provide an optical film laminating the polarizing plate, further another object of the present invention to provide an image display such as a liquid crystal display using the polarizing plate or the optical film.

Means for Solving the Problems

The inventors have conducted serious studies in order to solve the above tasks with findings that the objects can be achieved with an adhesive for polarizing plate shown below, having led to completion of the present invention.

Thus, a first aspect of the invention is directed to an adhesive for a polarizing plate for use in fixing a transparent protective film on at least one side of a polarizer, the adhesive for a polarizing plate including a resin solution containing a polyvinyl alcohol-based resin and a water-soluble silicate.

The content of the water-soluble silicate is preferably from 1 to 100 parts by weight based on 100 parts by weight of the polyvinyl alcohol-based resin. If the content of the water-soluble silicate is less than 1 part by weight, it may be difficult to suppress the occurrence of knicks, or the refractive index of the adhesive layer may be too high so that reflection of light may be more likely to occur at each of the interface between a polarizer and the adhesive layer and the interface between a transparent protective film and the adhesive layer, which may tend to reduce the light transmittance of the polarizing plate. On the other hand, if the content of the silicate is more than 100 parts by weight, the adhesive layer may have reduced adhering strength or may have too low refractive index so that reflection of light may be more likely to occur at each of the interface between a polarizer and the adhesive layer and the interface between a transparent protective film and the adhesive layer, which may tend to reduce the light transmittance of the polarizing plate.

The water-soluble silicate is preferably at least one selected from the group consisting of lithium silicate, sodium silicate, and potassium silicate. The lithium silicate preferably has a molar $SiO_2/Li_2O$ ratio of 2 to 8. If the molar ratio is less than 2, a highly alkaline adhesive layer may be formed, which may tend to reduce the light transmittance of the polarizing plate in a humidified environment. On the other hand, if the molar ratio is more than 8, a water-soluble silicate cannot be formed. The sodium silicate preferably has a molar $SiO_2/Na_2O$ ratio of 2 to 5. The potassium silicate preferably has a molar $SiO_2/K_2O$ ratio of 2 to 5. If the molar ratio is less than 2, a highly alkaline adhesive layer may be formed, which may tend to reduce the light transmittance of the polarizing plate in a humidified environment. On the other hand, if the molar ratio is more than 5, a water-soluble silicate cannot be formed.

The invention is particularly advantageous when a polyvinyl alcohol-based resin containing an acetoacetyl group is used as the polyvinyl alcohol-based resin in the adhesive for a polarizing plate. The adhesive produced using a polyvinyl alcohol-based resin containing an acetoacetyl group can form a highly water-resistant adhesive layer. On the other hand, the occurrence of knicks is often observed when an adhesive for a polarizing plate produced with a polyvinyl alcohol-based resin containing an acetoacetyl group is used. In contrast, the use of the adhesive for a polarizing plate of the invention produced with a polyvinyl alcohol-based resin containing an acetoacetyl group can suppress the occurrence of knicks, because the adhesive contains a water-soluble silicate. Therefore, an adhesive for a polarizing plate that has water resistance and makes it possible to suppress the occurrence of knicks can be obtained.

On the other hand, a second aspect of the invention is directed to an adhesive for a polarizing plate for use in fixing a transparent protective film on at least one side of a polarizer, the adhesive for a polarizing plate including a resin solution containing a polyvinyl alcohol-based resin, a silicate, and an amino acid and/or a sulfur-containing amino acid having at least one amino group and at least one acidic group.

When an amino acid and/or a sulfur-containing amino acid having at least one amino group and at least one acidic group is used as a crosslinking agent, an adhesive for a polarizing plate with high adhering strength can be obtained. The use of the adhesive for a polarizing plate of the invention makes it possible to form an adhesive layer that resists peeling at interfaces with a polarizer and a transparent protective film even when immersed in warm water. In addition, an increase in the refractive index of the adhesive layer can be suppressed, so that reflection of light will be less likely to occur at each of the interface between a polarizer and the adhesive layer and the interface between a transparent protective film and the adhesive layer, which makes it possible to suppress a reduction in the light transmittance of the polarizing plate.

The content of the amino acid and/or the sulfur-containing amino acid is preferably from 5 to 50 parts by weight based on 100 parts by weight of the polyvinyl alcohol-based resin. If it is less than 5 parts by weight, the adhesive layer may have reduced water resistance, and if it is more than 50 parts by weight, the adhesive layer may tend to have reduced adhering strength.

The acidic group is preferably a carboxyl group or a sulfo group.

The polyvinyl alcohol-based resin is preferably a polyvinyl alcohol-based resin containing an acetoacetyl group. This makes it possible to form a highly water-resistant adhesive layer.

The silicate is preferably at least one selected from the group consisting of water-soluble lithium silicate, water-soluble sodium silicate, and water-soluble potassium silicate. The water-soluble lithium silicate preferably has a molar $SiO_2/Li_2O$ ratio of 2 to 8. If the molar ratio is less than 2, a highly alkaline adhesive layer may be formed, which may tend to reduce the light transmittance of the polarizing plate in a humidified environment. On the other hand, if the molar ratio is more than 8, a water-soluble silicate cannot be formed. The water-soluble sodium silicate preferably has a molar $SiO_2/Na_2O$ ratio of 2 to 5. The water-soluble potassium silicate preferably has a molar $SiO_2/K_2O$ ratio of 2 to 5. If the molar ratio is less than 2, a highly alkaline adhesive layer may be formed, which may tend to reduce the light transmittance of the polarizing plate in a humidified environment. On the other hand, if the molar ratio is more than 5, a water-soluble silicate cannot be formed.

The invention is also directed to a polarizing plate including a polarizer, an adhesive layer, and a transparent protective film provided on at least one side of the polarizer with the adhesive layer interposed therebetween, wherein the adhesive layer is made from the above adhesive for a polarizing plate. In the polarizing plate of the invention, the adhesive layer contains the water-soluble silicate, which suppresses the occurrence of knick defects in the process of bonding a polarizer and a transparent protective film together. In a humidified environment, the polarizing plate of the invention is also less likely to suffer from a reduction in light transmittance.

In the polarizing plate, the adhesive layer preferably has a thickness of 10 to 300 nm. If the adhesive layer has a thickness of less than 10 nm, the adhering strength may be insufficient, and if it has a thickness of more than 300 nm, optical reliability and humidity-resistant adhering strength may tend to decrease.

In addition, the adhesive layer preferably has a refractive index of 1.47 to 1.54. When the refractive index of the adhesive layer is out of the range of 1.47 to 1.54, the refractive index of the adhesive layer may be too low or high so that reflection of light may be more likely to occur at each of the interface between a polarizer and the adhesive layer and the interface between a transparent protective film and the adhesive layer, which may tend to reduce the light transmittance of the polarizing plate.

The invention is also directed to a method for manufacturing a polarizing plate including a polarizer and a transparent protective film provided on at least one side of the polarizer with an adhesive layer interposed therebetween, which includes the steps of: preparing the above adhesive for a polarizing plate; applying the adhesive for a polarizing plate to the surface of the polarizer, on which the adhesive layer is to be formed, and/or the surface of the transparent protective film, on which the adhesive layer is to be formed; and bonding the polarizer and the transparent protective film together.

The present invention also relates to an optical film, comprising a laminate including at least one piece of the above-described polarizing plate.

The present invention also relates to an image display, comprising the above-described polarizing plate or the above-described optical film.

Effect of the Invention

The adhesive for a polarizing plate according to the first aspect of the invention, which is produced using a polyvinyl alcohol-based resin in combination with a water-soluble silicate, has high adhering strength and can suppress the occurrence of knicks by the action of the water-soluble silicate. This can increase the yield in the manufacture of polarizing plates, and improve the productivity of polarizing plates. In addition, the differences between the refractive indices of a polarizer and the adhesive layer made from the adhesive for a polarizing plate containing the water-soluble silicate and between those of a transparent protective film and the adhesive layer are small so that reflection of light is less likely to occur at each of the interface between the polarizer and the adhesive layer and the interface between the transparent protective film and the adhesive layer, which makes it possible to prevent a reduction in the light transmittance of the polarizing plate.

The adhesive layer formed using the adhesive for a polarizing plate of the second aspect of the invention has a high level of adhering strength and water resistance and resists peeling at interfaces with a polarizer and a transparent protective film. In addition, the differences between the refractive indices of the adhesive layer and a polarizer and between those of the adhesive layer and a transparent protective film are small so that reflection of light is less likely to occur at each of the interface between the polarizer and the adhesive layer and the interface between the transparent protective film and the adhesive layer, and therefore the light transmittance of the polarizing plate is less likely to decrease. The adhesive for a polarizing plate of the invention is also advantageous in that not only it has low reactivity at room temperature and therefore has a high level of liquid stability, but also it is formaldehyde-free and therefore can contribute to an improvement in working environment and an increase in product safety.

MODES FOR CARRYING OUT THE INVENTION

In a first mode of the invention, the adhesive for a polarizing plate is a resin solution containing a polyvinyl alcohol-based resin and a water-soluble silicate.

In a second mode of the invention, the adhesive for a polarizing plate is a resin solution containing a polyvinyl alcohol-based resin, a silicate, and an amino acid and/or a sulfur-containing amino acid having one or more amino groups and one or more acidic groups.

The polyvinyl alcohol-based resin may be a polyvinyl alcohol resin or a polyvinyl alcohol-based resin having an acetoacetyl group. The polyvinyl alcohol-based resin having an acetoacetyl group can form a highly reactive functional group-containing polyvinyl alcohol-based adhesive and thus is preferred because it can increase the durability of the polarizing plate.

Examples of polyvinyl alcohol-based resin include: a polyvinyl alcohol obtained by saponifying a polyvinyl acetate; a derivative thereof; a saponified copolymer of vinyl acetate and a monomer copolymerizable therewith; and polyvinyl alcohols modified by acetalization, urethanization, etherification, grafting, phosphate esterification and the like. Examples of the monomers include, unsaturated carboxylic acids such as maleic anhydride, fumaric acid, crotonic acid, itaconic acid and (meth)acrylic acid, and esters thereof; α-olefins such as ethylene and propylene; (meth)allylsulfonic acid or sodium salt thereof, (meth)allylsulfonate; sodium sulfonate (monoalkyl maleate), sodium disulfonate (alkyl maleate); N-methylolacrylamide; an alkai salt of acrylamide alkylsulfonate; N-vinylpyrrolidone, a derivative of N-vinylpyrrolidone and the like. The polyvinyl alcohol-based resins can be either used alone or in combination of two kinds or more.

While no specific limitation is imposed on a polyvinyl alcohol-based resin, an average degree of polymerization is from about 100 to about 5000, preferably from 1000 to 4000 and an average degree of saponification is from about 85 to about 100 mol %, preferably from 90 to 100 mol % in consideration of adherence.

A polyvinyl alcohol-based resin having an acetoacetyl group is obtained by reacting a polyvinyl alcohol-based resin and diketene to each other with a known method. Examples of known methods include: a method in which a polyvinyl alcohol-based resin is dispersed into a solvent such as acetic acid, to which diketene is added and a method in which a polyvinyl alcohol-based resin is previously dissolved into a solvent such as dimethylformamide or dioxane, to which diketene is added. Another example is a method in which diketene gas or diketene liquid is brought into direct contact with a polyvinyl alcohol.

No specific limitation is imposed on a degree of modification by an acetoacetyl group in a polyvinyl alcohol-based resin having an acetoacetyl group or groups as far as the degree of modification is 0.1 mol % or more. If the degree of modification is less than 0.1 mol %, water resistance of an adhesive layer is insufficient, which is improper. A degree of modification by an acetoacetyl group is preferably from about 0.1 to about 40 mol %, more preferably from 2 to 7 mol %. If a degree of modification by an acetoacetyl group exceeds 40 mol %, reaction sites with a crosslinking agent is fewer to thereby reduce an effect of improvement on moisture resistance and heat resistance. The degree of modification by an acetoacetyl group is a value determined by NMR.

In the first mode of the invention, a crosslinking agent may also be added to the resin solution. Any of crosslinking agents that have been used in a polyvinyl alcohol-based adhesive can be used as a crosslinking agent in the present invention without a specific limitation thereon. A crosslinking agent that can be used is a compound having at least two functional groups having reactivity with a polyvinyl alcohol-based resin. Examples thereof include: alkylene diamines having an alkylene group and two amino groups such as ethylene diamine, triethylene diamine and hexamethylene diamine; isocyanates such as tolylene diisocyanate, hydrogenated tolylene diisocyanate, trimethylolpropane tolylene diisocyanate adduct, triphenylmethane triisocyanate, methylenebis(4-phenylmethane)triisocyanate and isophorone diisocyanate, and ketoxime-blocked products thereof or isocyanates of phenol-blocked products; epoxy compounds such as ethylene glycol diglycidyl ether, polyethylene glycol diglycidyl ether, glycerin di- or triglicydyl ether, 1,6-hexanediol diglycidyl ether, trimethylolpropane triglycidyl ether, diglicidyl aniline and diglicidyl amine; monoaldehydes such as formaldehyde, acetaldehyde, propionaldehyde and butylaldehyde; dialdehydes such as glyoxal, malonaldehyde, succindialdehyde, glutardialdehyde, maleic dialdehyde and phthaldialdehyde; amino-formaldehyde resins such as condensates with formaldehyde of methylolurea, methylolmelamine, alkylated methylolurea, alkylated methylolmelamine, acetoguanamine and benzoguanamine; zirconium compounds such as zirconium acetate, zirconium nitrate, zirconium carbonate, zirconium hydroxide, and zirconium oxychloride; salts of glyoxylic acid such as metal salts of glyoxylic acid (in which the metal is typically an alkali metal such as lithium, sodium, or potassium, an alkaline-earth metal such as magnesium or calcium, a transition metal such as titanium, zirconium, chromium, manganese, iron, cobalt, nickel, or copper, zinc, aluminum, or the like) and amine salts of glyoxylic acid (in which the amine is typically ammonia, monomethylamine, dimethylamine, trimethylamine, or the like); an amino acid or sulfur-containing amino acid having one or more basic groups and one or more acidic groups; acetal compounds such as dimethoxyethanal, diethoxyethanal, and dialkoxyethanal; and salts of a bivalent or trivalent metal such as sodium, potassium, magnesium, calcium, aluminum, iron, or nickel, and oxides thereof. These may be used singly or in combination of two or more. In particular, an amino acid or sulfur-containing amino acid having one or more basic groups and one or more acidic groups is preferably used. The basic group is preferably an amino group, and the acidic group is preferably a carboxyl group or a sulfo group. Examples of the amino acid include glycine, alanine, phenylalanine, valine, leucine, isoleucine, lysine, proline, serine, threonine, tryptophan, histidine, tyrosine, arginine, asparagine, aspartic acid, aspartame, glutamine, glutamic acid, copolymers of any of these amino acids and (meth)acrylic acid, etc. Examples of the sulfur-containing amino acid include methionine, cysteine, cystine, taurine, etc. In particular, a sulfur-containing amino acid having a sulfo group, such as taurine is preferably used. The crosslinking agent to be used may be a coupling agent such as a silane coupling agent and a titanium coupling agent.

While the amount of the crosslinking agent to be blended may be appropriately determined depending on the type of the polyvinyl alcohol-based resin and the like, it is generally from about 0.1 to about 50 parts by weight, preferably from about 0.2 to about 30 parts by weight, more preferably from 0.5 to 20 parts by weight, based on 100 parts by weight of the polyvinyl alcohol-based resin. In such ranges, good adhesion properties can be obtained.

To increase durability, a polyvinyl alcohol-based resin containing an acetoacetyl group should be used. In this case, the content of the crosslinking agent may be as stated above. If the content of the crosslinking agent is too high, the adhesive may have reduced liquid stability and a shortened usable time span (pot life), so that it may be difficult to use the adhesive industrially.

The water-soluble silicate used in the first mode of the invention may be a compound represented by the general formula $M_2O \cdot nSiO_2$, wherein M represents an alkali metal, an organic base, or the like. Examples of the alkali metal include lithium, sodium, potassium, and the like, and examples of the organic base include a tertiary ammonium, a quaternary ammonium, a guanidium, and the like. The number n is preferably from 2 to 8.

In the first mode of the invention, the water-soluble silicate to be used is preferably at least one selected from the group consisting of lithium silicate, sodium silicate, and potassium silicate. The lithium silicate preferably has a molar $SiO_2/Li_2O$ ratio of 2 to 8. The sodium silicate preferably has a molar $SiO_2/Na_2O$ ratio of 2 to 5, more preferably 2.5 to 5. The potassium silicate preferably has a molar $SiO_2/K_2O$ ratio of 2 to 5, more preferably 2.5 to 5.

Based on 100 parts by weight of the polyvinyl alcohol-based resin, the content of the water-soluble silicate is preferably from 1 to 100 parts by weight, more preferably from 1 to 50 parts by weight, even more preferably from 1 to 30 parts by weight.

In the first mode of the invention, the adhesive for a polarizing plate is a resin solution containing a polyvinyl alcohol-based resin and a water-soluble silicate, and the adhesive is generally used in the form of an aqueous solution. The concentration of the resin solution is preferably, but not limited to, 0.1 to 15% by weight, more preferably 0.5 to 10% by weight, in view of coating ability, storage stability, etc.

The viscosity of the resin solution to be used is generally, but not limited to, in the range of 1 to 50 mPa·s. In the process of manufacturing a polarizing plate, knicks tend to occur more frequently as the viscosity of the resin solution decreases. However, when the adhesive for a polarizing plate according to the first mode of the invention is used, the occurrence of knicks can be suppressed even in a low viscosity range such as the range of 1 to 20 mPa·s, and therefore the occurrence of knicks can be suppressed regardless of the viscosity of the resin solution. A polyvinyl alcohol-based resin containing an acetoacetyl group cannot have a high degree of polymerization as compared with a general polyvinyl alcohol resin, and therefore has been used at a low level of viscosity as mentioned above. According to the invention, however, the occurrence of knicks, which would otherwise be caused by the low viscosity of the resin solution, can be suppressed even when a polyvinyl alcohol-based resin containing an acetoacetyl group is used.

In the second mode of the invention, an amino acid or sulfur-containing amino acid having one or more amino groups and one or more acidic groups is used as a crosslinking agent. These may be used in combination. The acidic group is preferably a carboxyl group or a sulfo group.

Examples of the amino acid include glycine, alanine, phenylalanine, valine, leucine, isoleucine, lysine, proline, serine, threonine, tryptophan, histidine, tyrosine, arginine, asparagine, aspartic acid, aspartame, glutamine, glutamic acid, copolymers of any of these amino acids and (meth)acrylic acid, etc. These may be used singly or in combination of two or more.

Examples of the sulfur-containing amino acid include methionine, cysteine, cystine, taurine, etc. These may be used singly or in combination of two or more. In particular, a sulfur-containing amino acid having a sulfo group, such as taurine is preferably used.

Based on 100 parts by weight of the polyvinyl alcohol-based resin, the content of the amino acid and/or the sulfur-containing amino acid is preferably from 5 to 50 parts by weight, more preferably from 10 to 40 parts by weight. It should be noted that when the amino acid is used in combination with the sulfur-containing amino acid, it means the total content.

Another crosslinking agent may also be added to the resin solution. When another crosslinking agent is added, the amount of another crosslinking agent should be 50% by weight or less based on the total amount of the crosslinking agents. Another crosslinking agent may be any of those listed above.

To increase durability, a polyvinyl alcohol-based resin containing an acetoacetyl group should be used. Also in this case, the content of the crosslinking agent may be as stated above. If the content of the crosslinking agent is too high, the adhesive may have reduced liquid stability and a shortened usable time span (pot life), so that it may be difficult to use the adhesive industrially.

The silicate may be a compound represented by the general formula $M_2O \cdot nSiO_2$, wherein M represents an alkali metal, an organic base, or the like. Examples of the alkali metal include lithium, sodium, potassium, and the like, and examples of the organic base include a tertiary ammonium, a quaternary ammonium, a guanidium, and the like. The number n is preferably from 2 to 8.

In the second mode of the invention, the silicate to be used is preferably at least one selected from the group consisting of water-soluble lithium silicate, water-soluble sodium silicate, and water-soluble potassium silicate. The water-soluble lithium silicate preferably has a molar $SiO_2/Li_2O$ ratio of 2 to 8. The water-soluble sodium silicate preferably has a molar $SiO_2/Na_2O$ ratio of 2 to 5, more preferably 2.5 to 5. The water-soluble potassium silicate preferably has a molar $SiO_2/K_2O$ ratio of 2 to 5, more preferably 2.5 to 5.

Based on 100 parts by weight of the polyvinyl alcohol-based resin, the content of the silicate is preferably from 1 to 100 parts by weight, more preferably from 1 to 50 parts by weight, even more preferably from 1 to 30 parts by weight. If the content of the silicate is less than 1 part by weight, the refractive index of the adhesive layer may be too high so that reflection of light may be more likely to occur at each of the interface between a polarizer and the adhesive layer and the interface between a transparent protective film and the adhesive layer, which may tend to reduce the light transmittance of the polarizing plate. On the other hand, if the content of the silicate is more than 100 parts by weight, the adhesive layer may have reduced adhering strength or may have too low refractive index so that reflection of light may be more likely to occur at each of the interface between a polarizer and the adhesive layer and the interface between a transparent protective film and the adhesive layer, which may tend to reduce the light transmittance of the polarizing plate.

In the second mode of the invention, the adhesive for a polarizing plate is a resin solution containing a polyvinyl alcohol-based resin, a silicate, and an amino acid and/or a sulfur-containing amino acid having one or more amino groups and one or more acidic groups, and the adhesive is generally used in the form of an aqueous solution. The concentration of the resin solution is preferably, but not limited to, 0.1 to 15% by weight, more preferably 0.5 to 10% by weight, in view of coating ability, storage stability, etc.

The viscosity of the resin solution to be used is generally, but not limited to, in the range of 1 to 50 mPa·s.

There is no restriction on the method of preparing the resin solution for use as the adhesive for a polarizing plate of the invention. Typically, the resin solution is prepared by a process including mixing the polyvinyl alcohol-based resin and the crosslinking agent, appropriately adjusting the concentration, and then adding the silicate (water-soluble silicate) to the mixture. Optionally, a polyvinyl alcohol-based resin containing an acetoacetyl group may be used as the polyvinyl alcohol-based resin, and if a relatively large amount of the crosslinking agent is to be added, the crosslinking agent may be added after the polyvinyl alcohol-based resin is mixed with the silicate (water-soluble silicate), taking into account the stability of the solution, the time at which the resulting resin solution is used, etc. It will be understood that the concentration of the resin solution for use as the adhesive for a polarizing plate may also be appropriately adjusted after the preparation of the resin solution.

The adhesive for polarizing plate may also contain various types of tackifiers, stabilizing agents such as ultraviolet absorbing agents, antioxidants, heat-resistant stabilizing agents, and hydrolysis-resistant stabilizing agents, and so on.

A polarizing plate of the present invention is manufactured by lamination to bond a transparent protective film to a polarizer with the adhesive. In the obtained polarizing plate, a transparent protective film or transparent protective films are provided on one surface or both surfaces of a polarizer with an adhesive agent layer formed with the adhesive for polarizing plate interposed therebetween.

Coating of the adhesive may be performed on one/or both of the transparent protective film and the polarizer. Coating of the adhesive is preferably conducted so as to achieve a thickness after drying of the order in the range of from 10 to 300 nm. The thickness of the adhesive layer is more preferably from 10 to 200 nm, still more preferably from 20 to 150 nm, in terms of achieving uniform in-plane thickness and sufficient adhesive force.

Examples of methods for controlling the thickness of the adhesive layer include, but are not limited to, methods including controlling the solid concentration of the adhesive solution or controlling an adhesive coater. While the thickness of the adhesive layer may be measured by any method, cross-sectional observation measurement by SEM (Scanning Electron Microscopy) or TEM (Transmission Electron Microscopy) is preferably used. The adhesive may be applied by any process, and various methods such as roll methods, spraying methods, and immersion methods may be used for the application.

After the adhesive is applied, the polarizer and the transparent protective film are bonded together using a roll laminator or any other means. After the bonding, a drying process is performed to form an adhesive layer comprising a dry coating layer. The drying temperature may be from about 5 to about 150° C., preferably from 30 to 120° C., and the drying time may be 120 seconds or more, preferably 300 seconds or more.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film comprises dichromatic materials such as iodine, dichromatic dye is suitably used. Although thickness of polarizer is not especially limited, the thickness of about 5 to about 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

Preferable Materials that form the transparent protective film, which is provided one side or both sides of the polarizer is the material having outstanding transparency, mechanical strength, heat stability and outstanding moisture interception property, or the like. As materials of the above-mentioned transparent protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a transparent protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the above-mentioned polymers may be mentioned. The transparent protective film is generally laminated to the polarizer with the adhesive layer, but thermosetting resins or ultraviolet curing resins such as (meth)acrylic, urethane, acrylic urethane, epoxy, or silicone resins may be used for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

Moreover, as is described in JP-A No. 2001-343529 (WO 01/37007), polymer films, for example, resin compositions including (A) thermoplastic resins having substituted and/or non-substituted imido group in sidechain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. Since the films are less in retardation and less in photoelastic coefficient, faults such as unevenness due to a strain in a polarizing plate can be removed and besides, since they are less in moisture permeability, they are excellent in durability under humidified environment.

Thickness of the transparent protective film can be properly determined and generally in the range of from about 1 to about 500 μm from the viewpoint of a strength, workability such as handlability, requirement for a thin film and the like. Especially, the thickness is preferably in the range of from 1 to 300 μm and more preferably in the range of from 5 to 200 μm. Knicks becomes more likely to occur as the thickness of the transparent protective film decreases. It is therefore particularly preferred that the transparent protective film should have a thickness of 5 to 100 μm.

Note that in a case where the transparent protective films are provided on both sides of a polarizer, the protective films made from the same polymer may be used on both sides thereof or alternatively, the protective films made from polymer materials different from each other may also be used on respective both sides thereof.

At least one selected from a cellulose resin, a polycarbonate resin, a cyclic polyolefin resin, and a (meth)acrylic resin is preferably used for the transparent protective film according to the present invention.

The cellulose resin is an ester of cellulose and a fatty acid. Examples of such a cellulose ester resin include triacetyl cellulose, diacetyl cellulose, tripropionyl cellulose, dipropionyl cellulose, and the like. In particular, triacetyl cellulose is preferred. Much commercially available triacetyl celluloses are placing on sale and are advantageous in view of easy availability and cost. Examples of commercially available products of triacetyl cellulose include UV-50, UV-80, SH-80, TD-80U, TD-TAC, and UZ-TAC (trade names) manufactured by Fujifilm Corporation, and KC series manufactured by Konica Minolta. In general, these triacetyl cellulose products have a thickness direction retardation (Rth) of about 60 nm or less, while having an in-plane retardation (Re) of almost zero.

Cellulose resin films with relatively small thickness direction retardation may be obtained by processing any of the above cellulose resins. Examples of the processing method include a method that includes laminating a general cellulose-based film to a base film such as a polyethylene terephthalate, polypropylene, or stainless steel film, coated with a solvent such as cyclopentanone or methyl ethyl ketone, drying the laminate by heating (for example, at 80 to 150° C. for 3 to 10 minutes) and then separating the base film; and a method that includes coating a general cellulose resin film with a solution of a norbornene resin, a (meth)acrylic resin or the like in a solvent such as cyclopentanone or methyl ethyl ketone, drying the coated film by heating (for example, at 80 to 150° C. for 3 to 10 minutes), and then separating the coating.

The cellulose resin film with a relatively small thickness direction retardation to be used may be a fatty acid cellulose resin film with a controlled degree of fat substitution. While triacetyl cellulose for general use has a degree of acetic acid substitution of about 2.8, preferably, the degree of acetic acid substitution is controlled to 1.8 to 2.7, more preferably, so that the Rth can be reduced. The Rth may also be controlled to be low by adding a plasticizer such as dibutyl phthalate, p-toluenesulfonanilide, and acetyl triethyl citrate, to the fatty acid-substituted cellulose resin. The plasticizer is preferably added in amount of 40 parts by weight or less, more preferably of 1 to 20 parts by weight, still more preferably of 1 to 15 parts by weight, to 100 parts by weight of the fatty acid cellulose resin.

For example, the cyclic polyolefin resin is preferably a norbornene resin. Cyclic olefin resin is a generic name for resins produced by polymerization of cyclic olefin used as a polymerizable unit, and examples thereof include the resins disclosed in JP-A Nos. 01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrides thereof. Examples of the cyclic olefin include norbornene monomers.

Various commercially available cyclic polyolefin resins are placing on sale. Examples thereof include Zeonex (trade name) and Zeonor (trade name) series manufactured by Zeon Corporation, Arton (trade name) series manufactured by JSR Corporation, Topas (trade name) series manufactured by Ticona, and Apel (trade name) series manufactured by Mitsui Chemicals, Inc.

The (meth)acrylic resin preferably has a glass transition temperature (Tg) of 115° C. or more, more preferably of 120° C. or more, still more preferably of 125° C. or more, particularly preferably of 130° C. or more. If the Tg is 115° C. or more, the resulting polarizing plate can have good durability. The upper limit to the Tg of the (meth)acrylic resin is preferably, but not limited to, 170° C. or less, in view of formability and the like. The (meth)acrylic resin can form a film with an in-plane retardation (Re) of almost zero and a thickness direction retardation (Rth) of almost zero.

Any appropriate (meth)acrylic resin may be used as long as the advantages of the present invention are not reduced. Examples of such a (meth)acrylic resin include poly(meth)acrylate such as poly(methyl methacrylate), methyl methacrylate-(meth)acrylic acid copolymers, methyl methacrylate-(meth)acrylate copolymers, methyl methacrylate-acrylate-(meth)acrylic acid copolymers, methyl (meth)acrylate-styrene copolymers (such as MS resins), and alicyclic hydrocarbon group-containing polymers (such as methyl methacrylate-cyclohexyl methacrylate copolymers and methyl methacrylate-norbornyl (meth)acrylate copolymers). Poly ($C_{1-6}$ alkyl (meth)acrylate) such as poly(methyl (meth)acrylate) is preferred, and a methyl methacrylate-based resin mainly composed of a methyl methacrylate unit (50 to 100% by weight, preferably 70 to 100% by weight) is more preferred.

Examples of the (meth)acrylic resin include Acrypet VH and Acrypet VRL20A each manufactured by Mitsubishi Rayon Co., Ltd., (meth)acrylic resins having a ring structure in their molecule as disclosed in JP-A No. 2004-70296, and high-Tg (meth)acrylic resins produced by intramolecular crosslinking or intramolecular cyclization reaction.

Lactone ring structure-containing (meth)acrylic resins may also be used, because they have high heat resistance and high transparency and also have high mechanical strength after biaxially stretched.

Examples of the lactone ring structure-containing (meth)acrylic reins include the lactone ring structure-containing (meth)acrylic reins disclosed in JP-A Nos. 2000-230016, 2001-151814, 2002-120326, 2002-254544, and 2005-146084.

The lactone ring structure-containing (meth)acrylic reins preferably have a ring structure represented by Formula (1):

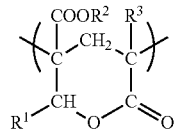

[Formula 1]

wherein $R^1$, $R^2$ and $R^3$ each independently represent a hydrogen atom or an organic residue of 1 to 20 carbon atoms. The organic residue may contain an oxygen atom(s).

The content of the lactone ring structure represented by Formula (1) in the lactone ring structure-containing (meth)acrylic resin is preferably from 5 to 90% by weight, more preferably from 10 to 70% by weight, still more preferably from 10 to 60% by weight, particularly preferably from 10 to 50% by weight. If the content of the lactone ring structure represented by Formula (1) in the lactone ring structure-containing (meth)acrylic resin is less than 5% by weight, its heat resistance, solvent resistance or surface hardness can be insufficient. If the content of the lactone ring structure represented by Formula (1) in the lactone ring structure-containing (meth)acrylic resin is more than 90% by weight, its formability or workability can be poor.

The lactone ring structure-containing (meth)acrylic resin preferably has a mass average molecular weight (also referred to as weight average molecular weight) of 1,000 to 2,000,000, more preferably of 5,000 to 1,000,000, still more preferably of 10,000 to 500,000, particularly preferably of 50,000 to 500,000. A mass average molecular weight outside the above range is not preferred in view of formability or workability.

The lactone ring structure-containing (meth)acrylic resin preferably has a Tg of 115° C. or more, more preferably of 120° C. or more, still more preferably of 125° C. or more, particularly preferably of 130° C. or more. For example, the resin with a Tg of 115° C. or more can produce good durability, when it is incorporated in the form of a transparent protective film in a polarizing plate. The upper limit to the Tg of the lactone ring structure-containing (meth)acrylic resin is preferably, but not limited to, 170° C. or less in view of formability and the like.

The total light transmittance of the lactone ring structure-containing (meth)acrylic resin, which may be measured according to ASTM-D-1003 with respect to injection molded products, is preferably as high as possible, and specifically, it is preferably 85% or more, more preferably 88% or more, still more preferably 90% or more. The total light transmittance is an index of transparency, and a total light transmittance of less than 85% can result in reduced transparency.

The transparent protective film to be used generally has an in-plane retardation of less than 40 nm and a thickness direction retardation of less than 80 nm. The in-plane retardation Re is expressed by the formula $Re=(nx-ny)\times d$, the thickness direction retardation Rth is expressed by the formula $Rth=(nx-nz)\times d$, and the Nz coefficient is represented by the formula $Nz=(nx-nz)/(nx-ny)$, where nx, ny and nz are the refractive indices of the film in the directions of its slow axis, fast axis and thickness, respectively, d is the thickness (nm) of the film, and the direction of the slow axis is a direction in which the in-plane refractive index of the film is maximum. Moreover, it is preferable that the transparent protective film may have as little coloring as possible. A protective film having a thickness direction retardation of from −90 nm to +75 nm may be preferably used. Thus, coloring (optical coloring) of polarizing plate resulting from a protective film may mostly be cancelled using a protective film having a thickness direction retardation (Rth) of from −90 nm to +75 nm. The thickness direction retardation (Rth) is preferably from −80 nm to +60 nm, and especially preferably from −70 nm to +45 nm.

Alternatively, the transparent protective film to be used may be a retardation plate having an in-plane retardation of 40 nm or more and/or a thickness direction retardation of 80 nm or more. The in-plane retardation is generally controlled in the range of 40 to 200 nm, and the thickness direction retardation is generally controlled in the range of 80 to 300 nm. The retardation plate for use as the transparent protective film also has the function of the transparent protective film and thus can contribute to a reduction in thickness.

The transparent protective film may be appropriately selected depending on the liquid crystal display to be produced therewith. In the case of VA (Vertical Alignment, including MVA and PVA), it is preferred that the transparent protective film on at least one side of the polarizing plate (on the cell side) has a retardation. Specifically, it preferably has a retardation Re in the range of 0 to 240 nm and a retardation Rth in the range of 0 to 500 nm. In terms of three-dimensional refractive index, the case of nx>ny=nz, nx>ny>nz, nx>nz>ny, or nx=ny>nz (positive A-plate, biaxial, negative C-plate) is preferred. In the case of VA, preferable is a combination of the positive A-plate and the negative C-plate or single use of the biaxial film. When polarizing plates are used on upper and lower sides of a liquid crystal cell, the transparent protective films may have a retardation on upper and lower sides of the liquid crystal cell, or one of the upper and lower transparent protective films may has a retardation.

For example, in the case of IPS (In-Plane Switching, including FFS), the transparent protective film for use in one of the polarizing plates may have or may not have a retardation. For example, a transparent protective film with no retardation is preferably provided on both upper and lower sides of a liquid crystal cell (cell sides), or otherwise a transparent protective film with a retardation is preferably provided on both or one of the upper and lower sides of a liquid crystal cell (for example, the biaxial film satisfying relationship of nx>nz>ny on the upper side with no retardation on the lower side or an positive A-plate provided on the upper side with a positive C-plate provided on the lower side). When it has a retardation, it preferably has a retardation Re in the range of −500 to 500 nm and a retardation Rth in the range of −500 to 500 nm. In terms of three-dimensional refractive index, nx>ny=nz, nx>nz>ny, nz>nx=ny, or nz>nx>ny (positive A-plate, biaxial, negative C-plate) is preferred.

The film with a retardation may be separately prepared and laminated to a transparent protective film with no retardation so that the function described above can be provided.

An easy adhesion treatment can be applied onto a surface of a transparent protective film which is adhered to a polarizer. Examples of easy adhesion treatments include: dry treatments such as a plasma treatment and a corona treatment; chemical treatment such as alkaline treatment (saponification); and a coating treatment in which an easy adhesion layer is formed. Among them, preferable are a coating treatment and an alkaline treatment each forming an easy adhesion layer. In formation of an easy adhesion layer, there can be used each of various kinds of easy adhesion materials such as a polyol resin, a polycarboxylic resin and a polyester resin. Note that a thickness of an easy adhesion layer is preferably usually from about 0.001 to about 10 µm, more preferably from about 0.001 to about 5 µm and especially preferably from about 0.001 to about 1 µm.

A hard coat layer may be prepared, or antireflection processing, processing aiming at sticking prevention, diffusion or anti glare may be performed onto the face on which the polarizing film of the above described transparent protective film has not been adhered.

In addition, the above-mentioned antireflection layer, sticking prevention layer, diffusion layer, anti glare layer, etc. may be built in the protective film itself, and also they may be prepared as an optical layer different from the protective film.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflector, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A polarizing plate or an optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, polarizing plates or optical films and, if necessity, lighting system, and by incorporating driving circuit. In the present invention, except that a polarizing plate or an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned polarizing plate or optical film has been located at one side or both sides of the liquid crystal cell, and with which a backlight or a reflector is used for a lighting system may be manufactured. In this case, the polarizing plate or optical film by the present invention may be installed in one side or both sides of the liquid crystal cell. When installing the polarizing plate or optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

EXAMPLES

Description will be given of a construction and effect of the present invention with examples and the like showing them below. Note that in the examples, part or parts and % are based on weight unless otherwise specified.

First Mode of the Invention

Example 1

Polarizer

A 75 μm-thick polyvinyl alcohol film with an average degree of polymerization of 2400 and a saponification degree of 99.9% by mole was immersed and allowed to swell in warm water at 30° C. for 60 seconds. The film was then immersed in an aqueous solution of iodine/potassium iodide (0.5/8 in weight ratio) at a concentration of 0.3%, while stretched to a stretch ratio of 3.5 times, so that the film was dyed. The film was then stretched in an aqueous borate ester solution at 65° C. such that the total stretch ratio reached 6 times. After the stretching, the film was dried in an oven at 40° C. for 3 minutes, resulting in a polarizer. The single transmittance Ts was measured using a spectrophotometer (V7100, manufactured by JASCO Corporation), and as a result, the light transmittance was 42.50%.
(Transparent Protective Film)

An 80-μm thick triacetylcellulose (TAC) film was used.
(Preparation of Aqueous Adhesive Solution)

In pure water were dissolved 100 parts of a polyvinyl alcohol (PVA)-based resin containing an acetoacetyl (AA) group (1,200 in average degree of polymerization, 98.5% by mole in degree of saponification, 5% by mole in degree of acetoacetylation) and 10 parts of sodium silicate (with a molar $SiO_2/Na_2O$ ratio of 4) under the temperature condition of 30° C., and the solids concentration was adjusted to 4%, so that an aqueous adhesive solution was obtained.
(Preparation of Polarizing Plate)

The aqueous adhesive solution was applied to one side of the transparent protective film so that an 80 nm thick adhesive layer could be formed after drying. Subsequently, the adhesive-carrying transparent protective films were bonded to both sides of the polarizer under the temperature condition of 23° C. using a roller, and then dried at 55° C. for 6 minutes to form a polarizing plate.

Examples 2 to 11, Comparative Examples 1 to 4, and Reference Example 1

Aqueous adhesive solutions were prepared by the same method as in Example 1, except that the formulations shown in Table 1 were used instead, respectively. Polarizing plates were prepared as in Example 1, except that the prepared aqueous adhesive solutions were used instead, respectively.
[Measurement and Evaluation]
(Refractive Index of Adhesive Layer)

The prepared aqueous adhesive solution was applied onto a transparent film using an applicator and dried at 70° C. for 10 minutes to form an adhesive layer. Subsequently, the adhesive layer (5 μm) was peeled off from the transparent film, and the refractive index of the adhesive layer was measured using a prism coupler (SPA-4000, manufactured by Sairon Technology, Inc.)
(Light Transmittance of Polarizing Plate)

The single transmittance Ts was measured using a spectrophotometer (V7100, manufactured by JASCO Corporation).
(Adhesion)

The edge of a cutter knife was inserted between the polarizer and the transparent protective film at the end of the polarizing plate. At the incision part, the polarizer and the transparent protective film were pinched and pulled in opposite directions, respectively. In this process, the case where the polarizer and/or the transparent protective film was broken and not able to be peeled off was evaluated as "O" (good adhesion), the case where partial peeling occurred between the polarizer and the transparent protective film was evaluated as "Δ" (slightly poor adhesion), and the case where the polarizer was completely peeled off from the transparent protective film was evaluated as "X" (poor adhesion).
(Peeling)

The polarizing plate was cut 50 mm along the direction of the absorption axis of the polarizer and 25 mm along the direction perpendicular to the absorption axis, so that a sample piece was obtained. The sample piece was allowed to stand in a heated and humidified atmosphere at 60° C. and 95% RH for 200 hours. Then the case where no peeling occurred between the polarizer and the transparent protective film was evaluated as good (O), the case where separation occurred at the end portion was evaluated as slightly poor (Δ), and the case where peeling occurred entirely was evaluated as poor (X).
(Appearance Evaluation: Knick Defects)

A sample of 1,000 mm×1,000 mm was prepared by cutting the polarizing plate. The polarizing plate sample was placed under a fluorescent lamp. Another polarizing plate was placed on the light source-side of the polarizing plate sample so that their absorption axes were orthogonal to each other, and in this arrangement, the parts where light leakage occurred (point defects and knick defects) were counted.
(Heating and Humidifying Test)

The polarizing plate was cut 50 mm along the direction of the absorption axis of the polarizer and 25 mm along the direction perpendicular to the absorption axis, and the cut piece was bonded to a glass plate with a pressure-sensitive adhesive interposed therebetween, so that a sample was obtained. The light transmittance of the sample was measured using a spectrophotometer (V7100, manufactured by JASCO Corporation). Subsequently, the sample was allowed to stand in a heated and humidified atmosphere at 60° C. and 95% RH for 200 hours, and then the light transmittance was measured in the same manner. Table 1 shows the amount of change (difference) in light transmittance before and after the heating and humidifying test. On the other hand, the sample was allowed to stand in a heated and humidified atmosphere at 85° C. and 85% RH for 200 hours, and then the light transmittance was measured in the same manner. Table 1 also shows the amount of change (difference) in light transmittance before and after the heating and humidifying test.

TABLE 1

| | Aqueous adhesive solution | | | | | | | |
|---|---|---|---|---|---|---|---|---|
| | PVA resin | | Additive | | | Refractive index of adhesive layer | Transparent protective film | Light transmittance (%) of polarizer |
| | Type | Amount (parts) | Type | Molar Si/alkali metal ratio | Amount (parts) | | | |
| Example 1 | AA-modified | 100 | Na silicate | 4 | 10 | 1.51 | TAC | 42.50 |
| Example 2 | AA-modified | 100 | Na silicate | 4 | 5 | 1.51 | | |
| Example 3 | AA-modified | 100 | Na silicate | 4 | 30 | 1.50 | | |
| Example 4 | AA-modified | 100 | Na silicate | 4 | 50 | 1.50 | | |
| Example 5 | AA-modified | 100 | Na silicate | 4 | 80 | 1.49 | | |
| Example 6 | AA-modified | 100 | Na silicate | 2 | 80 | 1.49 | | |
| Example 7 | Completely saponified | 100 | Na silicate | 4 | 10 | 1.51 | | |
| Example 8 | AA-modified | 100 | Na silicate | 1.5 | 80 | 1.51 | | |
| Example 9 | AA-modified | 100 | Na silicate | 4 | 100 | 1.47 | | |
| Example 10 | AA-modified | 100 | K silicate | 3.5 | 10 | 1.51 | | |
| Example 11 | AA-modified | 100 | Li silicate | 7.5 | 10 | 1.51 | | |
| Comparative Example 1 | — | — | Na silicate | 4 | 100 | 1.46 | | |
| Comparative Example 2 | AA-modified | 100 | Alumina colloid | — | 30 | 1.56 | | |
| Comparative Example 3 | AA-modified | 100 | Silica colloid | — | 30 | 1.51 | | |
| Comparative Example 4 | AA-modified | 100 | — | — | — | 1.52 | | |
| Reference Example 1 | AA-modified | 100 | Na silicate | 4 | 200 | 1.47 | | |

| | Evaluation | | | | | |
|---|---|---|---|---|---|---|
| | Properties of polarizing plate | | | | Reduction in light transmittance by heating and humidifying test | |
| | Single transmittance (%) | Adhesion | Peeling | Knick defects (/m²) | 60° C./95% RH | 85° C./85% RH |
| Example 1 | 43.12 | ○ | ○ | 1 | 0.5 | 1.1 |
| Example 2 | 43.12 | ○ | ○ | 1 | 0.4 | 0.7 |
| Example 3 | 43.12 | ○ | ○ | 0 | 0.9 | 2.0 |
| Example 4 | 43.12 | ○ | ○ | 0 | 1.2 | 2.3 |
| Example 5 | 43.11 | ○ | ○ | 0 | 1.6 | 2.5 |
| Example 6 | 43.11 | ○ | ○ | 1 | 1.8 | 2.7 |
| Example 7 | 43.12 | ○ | Δ | 1 | 0.5 | 1.1 |
| Example 8 | 43.12 | ○ | ○ | 0 | 2.0 | 3.0 |
| Example 9 | 43.06 | Δ | ○ | 0 | 2.3 | 3.2 |
| Example 10 | 43.12 | ○ | ○ | 1 | 0.7 | 1.5 |
| Example 11 | 43.12 | ○ | ○ | 1 | 0.4 | 0.6 |
| Comparative Example 1 | 43.02 | X | X | 0 | — | — |
| Comparative Example 2 | 42.95 | ○ | ○ | 0 | 0.4 | 0.7 |
| Comparative Example 3 | 43.12 | ○ | ○ | 5 | 0.4 | 0.7 |
| Comparative Example 4 | 43.11 | ○ | ○ | 26 | 0.4 | 0.7 |
| Reference Example 1 | 43.06 | X | X | 0 | — | — |

Second Mode of the Invention

Example 1

Polarizer

A 75 μm-thick polyvinyl alcohol film with an average degree of polymerization of 2400 and a saponification degree of 99.9% by mole was immersed and allowed to swell in warm water at 30° C. for 60 seconds. The film was then immersed in an aqueous solution of iodine/potassium iodide (0.5/8 in weight ratio) at a concentration of 0.3%, while stretched to a stretch ratio of 3.5 times, so that the film was dyed. The film was then stretched in an aqueous borate ester solution at 65° C. such that the total stretch ratio reached 6 times. After the stretching, the film was dried in an oven at 40° C. for 3 minutes, resulting in a polarizer. The single transmittance Ts was measured using a spectrophotometer (V7100, manufactured by JASCO Corporation), and as a result, the light transmittance was 42.50%.

(Transparent Protective Film)

An 80-μm thick triacetylcellulose (TAC) film was used.

(Preparation of Aqueous Adhesive Solution)

In pure water were dissolved 100 parts of a polyvinyl alcohol (PVA)-based resin containing an acetoacetyl (AA) group (1,200 in average degree of polymerization, 98.5% by mole in degree of saponification, 5% by mole in degree of acetoacetylation), 10 parts of sodium silicate (with a molar $SiO_2/Na_2O$ ratio of 4) and 50 parts of taurine under the temperature condition of 30° C., so that an aqueous adhesive solution (viscosity of 9 mPa·s) was obtained.

(Preparation of Polarizing Plate)

The aqueous adhesive solution was applied to one side of the transparent protective film so that an 80 nm thick adhesive layer could be formed after drying. Subsequently, the adhesive-carrying transparent protective films were bonded to both sides of the polarizer under the temperature condition of 23° C. using a roller, and then dried at 55° C. for 6 minutes to form a polarizing plate.

Examples 2 to 7 and Comparative Examples 1 to 5

Aqueous adhesive solutions were prepared by the same method as in Example 1, except that the formulations shown in Table 1 were used instead, respectively. Polarizing plates were prepared as in Example 1, except that the prepared aqueous adhesive solutions were used instead, respectively.

[Measurement and Evaluation]

(Refractive Index of Adhesive Layer)

The prepared aqueous adhesive solution was applied onto a transparent film using an applicator and dried at 70° C. for 10 minutes to form an adhesive layer. Subsequently, the adhesive layer (5 μm) was peeled off from the transparent film, and the refractive index of the adhesive layer was measured using a prism coupler (SPA-4000, manufactured by Sairon Technology, Inc.)

(Adhesion)

The edge of a cutter knife was inserted between the polarizer and the transparent protective film at the end of the polarizing plate. At the incision part, the polarizer and the transparent protective film were pinched and pulled in opposite directions, respectively. In this process, the case where the polarizer and/or the transparent protective film was broken and not able to be peeled off was evaluated as "O" (good adhesion), the case where partial peeling occurred between the polarizer and the transparent protective film was evaluated as "Δ" (slightly poor adhesion), and the case where the polarizer was completely peeled off from the transparent protective film was evaluated as "X" (poor adhesion).

(Peeling)

The polarizing plate was cut 50 mm along the direction of the absorption axis of the polarizer and 25 mm along the direction perpendicular to the absorption axis, so that a sample piece was obtained. The sample piece was immersed in hot water at 60° C., and after 5 hours, the amount (mm) of peeling at the end of the sample piece was measured using a vernier caliper.

(Heating and Humidifying Test)

The polarizing plate was cut 50 mm along the direction of the absorption axis of the polarizer and 25 mm along the direction perpendicular to the absorption axis, and the cut piece was bonded to a glass plate with a pressure-sensitive adhesive interposed therebetween, so that a sample was obtained. The light transmittance of the sample was measured using a spectrophotometer (V7100, manufactured by JASCO Corporation). Subsequently, the sample was allowed to stand in a heated and humidified atmosphere at 60° C. and 95% RH for 200 hours, and then the light transmittance was measured in the same manner. Table 2 shows the amount of change (difference) in light transmittance before and after the heating and humidifying test.

(Pot Life)

The viscosity of the prepared aqueous adhesive solution was measured at a liquid temperature of 23° C. and an ambient temperature of 23° C. using Rheometer RS1 (manufactured by HAAKE Company) and coaxial cylinders Model 222-1267 and Model 222-1549, in which the time elapsed until the viscosity of the aqueous adhesive solution exceeded 50 cps was determined.

TABLE 2

| | Aqueous adhesive solution | | | | | | |
|---|---|---|---|---|---|---|---|
| | PVA resin | | Additive | | | Crosslinking agent | |
| | | | | Molar Si/alkali | | | |
| | Type | Amount | Type | metal ratio | Amount | Type | Amount |
| Example 1 | AA-modified | 100 | Na silicate | 4 | 10 | Taurine | 50 |
| Example 2 | AA-modified | 100 | Na silicate | 4 | 10 | Taurine | 5 |
| Example 3 | AA-modified | 100 | Na silicate | 4 | 10 | Aspartame | 50 |
| Example 4 | AA-modified | 100 | Na silicate | 4 | 10 | Asparagine | 50 |

TABLE 2-continued

| | | | | | | | |
|---|---|---|---|---|---|---|---|
| Example 5 | AA-modified | 100 | Na silicate | 4 | 10 | Alanine | 50 |
| Example 6 | AA-modified | 100 | K silicate | 4 | 10 | Taurine | 50 |
| Example 7 | AA-modified | 100 | Li silicate | 4 | 10 | Taurine | 50 |
| Comparative Example 1 | AA-modified | 100 | — | — | — | Taurine | 50 |
| Comparative Example 2 | AA-modified | 100 | Na silicate | 4 | 10 | Sodium glyoxylate | 20 |
| Comparative Example 3 | AA-modified | 100 | Na silicate | 4 | 10 | Adipic acid dihydrazide | 20 |
| Comparative Example 4 | AA-modified | 100 | Na silicate | 4 | 10 | Methylolmelamine | 20 |
| Comparative Example 5 | AA-modified | 100 | Na silicate | 4 | 10 | Zirconium carbonate | 20 |

| | Evaluation | | | | |
|---|---|---|---|---|---|
| | Refractive index of adhesive layer | Light transmittance (%) of polarizer | Adhesion | Peeling amount (mm) | Reduction in light transmittance by heating and humidifying test | Pot life |
| Example 1 | 1.51 | 42.50 | ○ | <1 | 0.5 | At least 24 hours |
| Example 2 | 1.51 | | ○ | 1.5 | 0.9 | At least 24 hours |
| Example 3 | 1.51 | | ○ | 2 | 0.5 | At least 24 hours |
| Example 4 | 1.51 | | ○ | 3 | 0.8 | At least 24 hours |
| Example 5 | 1.51 | | ○ | 5 | 0.5 | At least 24 hours |
| Example 6 | 1.52 | | ○ | <1 | 0.7 | At least 24 hours |
| Example 7 | 1.52 | | ○ | <1 | 0.4 | At least 24 hours |
| Comparative Example 1 | 1.52 | | ○ | 9 | 0.3 | At least 24 hours |
| Comparative Example 2 | 1.51 | | ○ | 15 | 0.5 | At least 24 hours |
| Comparative Example 3 | 1.51 | | ○ | 8 | 1.8 | At least 24 hours |
| Comparative Example 4 | 1.54 | | ○ | <1 | 0.5 | 3 hours |
| Comparative Example 5 | 1.56 | | ○ | <1 | 0.4 | 10 hours |

INDUSTRIAL APPLICABILITY

The adhesive for a polarizing plate of the invention is used to bond a transparent protective film to at least one side of a polarizer. The resulting polarizing plate or an optical film including a laminate having the polarizing plate is used for image display devices such as liquid crystal display devices, organic electroluminescent (EL) display devices, and plasma display panels (PDPs).

The invention claimed is:

1. A polarizing plate, comprising:
a polarizer;
an adhesive layer; and
a transparent protective film provided on at least one side of the polarizer with the adhesive layer interposed therebetween, wherein
the adhesive layer has a refractive index of 1.47 to 1.54, and is made from an adhesive comprising a resin solution containing a polyvinyl alcohol-based resin and at least one water-soluble silicate selected from the group consisting of water-soluble lithium silicate, water-soluble sodium silicate, and water-soluble potassium silicate,
wherein the water-soluble lithium silicate has a molar $SiO_2/Li_2O$ ratio of 2 to 8,
wherein the water-soluble sodium silicate has a molar $SiO_2/Na_2O$ ratio of 4 to 5,
and wherein the water-soluble potassium silicate has a molar $SiO_2/K_2O$ ratio of 2 to 5.

2. A polarizing plate, comprising:
a polarizer;
an adhesive layer; and
a transparent protective film provided on at least one side of the polarizer with the adhesive layer interposed therebetween, wherein
the adhesive layer has a refractive index of 1.47 to 1.55, and is made from an adhesive comprising a resin solution containing a polyvinyl alcohol-based resin, at least one water-soluble silicate selected from the group consisting of water-soluble lithium silicate, water-soluble sodium silicate, and water-soluble potassium silicate, and an amino acid and/or a sulfur-containing amino acid, having at least one amino group and at least one acidic group,
wherein the water-soluble lithium silicate has a molar $SiO_2/Li_2O$ ratio of 2 to 8,
wherein the water-soluble sodium silicate has a molar $SiO_2/Na_2O$ ratio of 4 to 5,
and wherein the water-soluble potassium silicate has a molar $SiO_2/K_2O$ ratio of 2 to 5.

3. The polarizing plate according to claim 1, wherein the content of the water-soluble silicate is from 1 to 100 parts by weight based on 100 parts by weight of the polyvinyl alcohol-based resin.

4. The polarizing plate according to claim 2, wherein the content of the amino acid and/or the sulfur-containing amino acid is from 5 to 50 parts by weight based on 100 parts by weight of the polyvinyl alcohol-based resin.

5. The adhesive for a polarizing plate according to claim 2, wherein the acidic group is a carboxyl group or a sulfo group.

6. The polarizing plate according to claim 1 or 2, wherein the polyvinyl alcohol-based resin is a polyvinyl alcohol-based resin containing an acetoacetyl group.

7. The polarizing plate according to claim 1 or 2, wherein the adhesive layer has a thickness of 10 nm to 300 nm.

8. An optical film, comprising a laminate comprising at least one piece of the polarizing plate according to claim 1 or 2.

9. An image display device, comprising the optical film according to claim 8.

10. An image display device, comprising the polarizing plate according to claim 1 or 2.

11. A method for manufacturing a polarizing plate comprising a polarizer and a transparent protective film provided on at least one side of the polarizer with an adhesive layer interposed therebetween, the method comprising the steps of:
   preparing an adhesive;
   applying the adhesive to a surface of the polarizer, on which the adhesive layer is to be formed, and/or a surface of the transparent protective film, on which the adhesive layer is to be formed; and
   bonding the polarizer and the transparent protective film together,
   wherein the adhesive comprises a resin solution containing a polyvinyl alcohol-based resin and at least one water-soluble silicate selected from the group consisting of water-soluble lithium silicate, water-soluble sodium silicate, and water-soluble potassium silicate,
   wherein the water-soluble lithium silicate has a molar $SiO_2/Li_2O$ ratio of 2 to 8,
   wherein the water-soluble sodium silicate has a molar $SiO_2/Na_2O$ ratio of 4 to 5,
   wherein the water-soluble potassium silicate has a molar $SiO_2/K_2O$ ratio of 2 to 5,
   and wherein the formed adhesive layer has a refractive index of 1.47 to 1.54;
   or, wherein the adhesive comprises a resin solution containing a polyvinyl alcohol based resin, at least one water-soluble silicate selected from the group consisting of water-soluble lithium silicate, water-soluble sodium silicate, and water-soluble potassium silicate, and an amino acid and/or a sulfur-containing amino acid, having at least one amino group and at least one acidic group,
   wherein the water-soluble lithium silicate has a molar $SiO_2/Li_2O$ ratio of 2 to 8,
   wherein the water-soluble sodium silicate has a molar $SiO_2/Na_2O$ ratio of 4 to 5,
   wherein the water-soluble potassium silicate has a molar $SiO_2/K_2O$ ratio of 2 to 5,
   and wherein the formed adhesive layer has a refractive index of 1.47 to 1.55.

* * * * *